United States Patent [19]

Gongen

[11] Patent Number: 5,052,545

[45] Date of Patent: Oct. 1, 1991

[54] APPARATUS FOR CONVEYING GRAIN

[75] Inventor: Mashanori Gongen, Hiroshima, Japan

[73] Assignee: Hokoku Kogyo Co., Ltd., Hiroshima, Japan

[21] Appl. No.: 551,376

[22] Filed: Jul. 11, 1990

[30] Foreign Application Priority Data

Oct. 31, 1989 [JP] Japan ................................. 1-283802

[51] Int. Cl.$^5$ .............................................. B65G 47/19
[52] U.S. Cl. .................................. 198/534; 198/818; 198/823; 198/841
[58] Field of Search ............... 198/818, 819, 823, 841, 198/860.5, 525, 534

[56] References Cited

U.S. PATENT DOCUMENTS

| 499,472 | 6/1893 | Robins, Jr. ........................ 198/818 X |
| 1,721,002 | 7/1969 | Cooper .............................. 198/534 |
| 2,803,950 | 8/1957 | Bayston ............................. 198/819 X |
| 3,212,628 | 10/1965 | Massey et al. .................... 198/823 X |
| 3,311,221 | 3/1967 | Burkitt et al. ................... 198/819 X |
| 3,724,646 | 4/1973 | Kornylak .......................... 198/841 X |
| 3,914,080 | 10/1975 | Kamp ............................... 198/819 X |

FOREIGN PATENT DOCUMENTS

| 499129 | 3/1951 | Belgium ............................ 198/823 |
| 0085710 | 5/1982 | Japan ................................ 198/819 |
| 0036209 | 2/1985 | Japan ................................ 198/819 |
| 0144209 | 7/1985 | Japan ................................ 198/819 |
| 0242307 | 9/1989 | Japan ................................ 198/818 |
| 491704 | 9/1938 | United Kingdom ............... 198/819 |
| 876268 | 8/1961 | United Kingdom ............... 198/823 |
| 887698 | 1/1962 | United Kingdom ............... 198/819 |
| 2167369 | 5/1986 | United Kingdom ............... 198/818 |

OTHER PUBLICATIONS

Spencer, Paul R.; "Xerox Disclosure Journal", vol. 1, No. 6, 6/1976.

Primary Examiner—D. Glenn Dayoan
Attorney, Agent, or Firm—Armstrong, Nikaido, Marmelstein, Kubovcik, & Murray

[57] ABSTRACT

An apparatus for conveying grain is disclosed, which includes a conveying belt disposed to extend through a cylinder for movement with the inner wall surface of the cylinder as a guide in order to prevent scattering of dust generated as grain is conveyed and also to permit conveying of a great quantity of grain.

8 Claims, 5 Drawing Sheets

APPARATUS FOR CONVEYING GRAIN

BACKGROUND OF THE INVENTION

When storing grain in a store tank or transferring grain from the store tank to a drying bin, grain is conveyed on an endless belt which is stretchedly passed around a pair of pulleys. The endless belt is moved such that a central portion of its conveying section is sagging. The conveying section of the endless belt is open at the top, and therefore, dust is generated when grain is transferred onto the endless belt and also during conveying of grain. The generated dust contaminates the plant, and therefore, a dust-proof cover is provided, or dust is absorbed by providing a dust absorber. To this end, the belt is covered from above by a cover made by thin steel plates.

However, the cover is liable to be insufficient, causing leakage of dust from a gap to contaminate the room of the plant. In addition, installation of the cover requires a sufficient space lest the grain being conveyed should strike the cover. Further, grain is put on a sagging central portion of the conveying section of the endless belt, that is, it can not be put beyond the angle of repose. Further, grain often falls from the belt.

Furthermore, the belt support and cover support consist of a plurality of support members and coupling members, thus complicating the overall structure.

SUMMARY OF THE INVENTION

The primary object of the invention is to provide an apparatus for conveying grain, which comprises a pair of pulleys, an endless belt passed around the pulleys, a cylinder provided such that at least an intermediate portion of a conveying section of the endless belt is adapted to run in one direction along the cylinder with its back surface in contact with the bottom of the cylinder, and a cover with a hopper and provided to cover one of the pulleys and endless belt at one end of the cylinder.

One of the pair of pulleys is provided with a belt driver to move the endless belt in one direction. A plurality of rollers may be used in addition to the pair of pulleys in case where the endless belt used is long or for changing the posture thereof. Generally, the upper run of the endless belt passed around the pair of pulleys constitutes a conveying section, and the lower run of the belt constitutes a return section. Where a broad space can be provided between the upper and lower runs of the endless belt, the surface of the lower run of the belt may constitute a conveying section.

According to the invention, a major portion of the lower surface of the conveying section of the endless belt is supported in contact with the inner wall surface of a lower portion of the cylinder. In a preferred embodiment of the invention, the endless belt is disposed such that its return section extends on the outer side of the cylinder lower portion.

The cylinder is supported horizontally or in a slightly inclined state. While its sectional profile is suitably circular, it is possible to adopt a polygonal sectional profile close to a circle, for instance octagonal or decagonal sectional profile. The cylinder may consist of a plurality of sections. For example, it may consists of a plurality of curved segments.

According to the invention, the endless belt located in the cylinder is curved along the shape of the inner wall surface of the cylinder lower portion, and in the neighborhood of the pair of pulleys it is not supported by the cylinder. The pulleys have a cylindrical or centrally tapered shape, so that the endless belt is held flat along the shape of the pulleys. On the portion of the endless belt supported by the cylinder, grain is transported in a large quantity in a state exceeding the angle of repose. However, since the endless belt becomes flat as it emerges from the cylinder and approaches the pulleys, grain falls from the end of the belt corresponding to the pulley and also from opposite edges of the belt. Utmost dust is generated when grain falls. In order to prevent such dust from escaping to the outside, a cover with a hopper is provided in contact with the end of the cylinder and in a manner to cover the endless belt. The cover also serves to receive falling grain.

With this arrangement according to the invention, a great quantity of grain can be conveyed, and the cylinder and cover can co-operate to prevent dust from scattering in various parts of the plant facility.

Another object of the invention is to provide an apparatus for conveying grain, in which the opposite edges of the endless belt in contact with the inner wall surface of a lower portion of cylinder each have a tapered surface tapered from the side of the front surface of the endless belt to the edge of the back surface.

With tapered opposite edges of the endless belt, when particles of grain supplied in such a quantity as not to reach the opposite edges of the endless belt are flung toward the belt edges, they will slip along the tapered surfaces toward the center of the belt. Thus, grain particles will never enter a gap between the endless belt and cylinder. Further, when grain is supplied in a great quantity so that its particles reach opposite edges of the endless belt, its load constitutes a force tending to urge the tapered surfaces against the inner wall surface of the cylinder. Consequently, the opposite edges of the endless belt are urged against the cylinder inner wall surface and prevent grain from entering the gap between the endless belt and cylinder.

A further object of the invention is to provide an apparatus for conveying grain, in which the cylinder has a slit formed in a lower portion to facilitate the accommodation of the conveying section of the endless belt in the cylinder.

The conveying section of the endless belt may be accommodated in the cylinder in one of two methods, i.e., one, in which a belt having opposite ends is passed through the cylinder before connecting the opposite ends to provide an endless belt, and one, in which cylinder divisions are assembled into the cylinder such that the conveying section of the endless belt extends through the cylinder. In either of these methods, either endless belt or cylinder has to be assembled to a final structure in the place where the apparatus is installed. According to the invention, the endless belt is inserted from its one edge into the cylinder through the slit by making use of its flexibility. According to the invention, therefore, the endless belt and cylinder may be assembled separately before assembling them together.

A still further object of the invention is to provide an apparatus for conveying grain, in which, in order that the endless belt is slidable smoothly and actively in the cylinder and in a state contacting therewith, the back surface of the endless belt is constituted by a material having a low coefficient of friction, for instance a fluorine resin or a fiber cloth thereof, or a plurality of small rollers are rotatably mounted in the inner wall surface of the cylinder in contact with the endless belt. If the resistance offered by the friction between the endless belt and cylinder inner wall surface is low, the endless belt is less worn, which is economical. In addition, no wasteful load is applied to the drive source, thus permitting improvement of durability A still further object of the invention is to provide an apparatus for conveying grain, which is provided with a pair of fins disposed at the downstream end of the cylinder and at the opposite edges of the endless belt which is rendered to be arcular in sectional profile by the inner wall surface of the cylinder and inclined toward each other as one goes in the direction of conveying of grain. With the pair of fins provided at the opposite edges of the endless belt, grain is conveyed over the endless belt between the pair of fins. As grain passes between the pair of fins, it is forced toward the center line of the belt while at the same time it is raised to a corresponding extent. Consequently, grain downstream of the fins is conveyed as a layer having a smaller width and a greater height than the layer upstream of the fins. By providing the status of the flow of grain, it is possible to convey grain up to the neighborhood of the downstream end of the conveying section of the endless belt without falling of grain from opposite edges of the portion of the endless belt not conveyed by the cylinder.

The above and other objects and features of the invention will become more apparent from the detailed description of the preferred embodiments of the invention.

DETAILED DESCRIPTION OF THE PREFERRED EMBODIMENTS

One embodiment of the present invention will now be described with reference to FIGS. 1 to 4.

Figure 1:
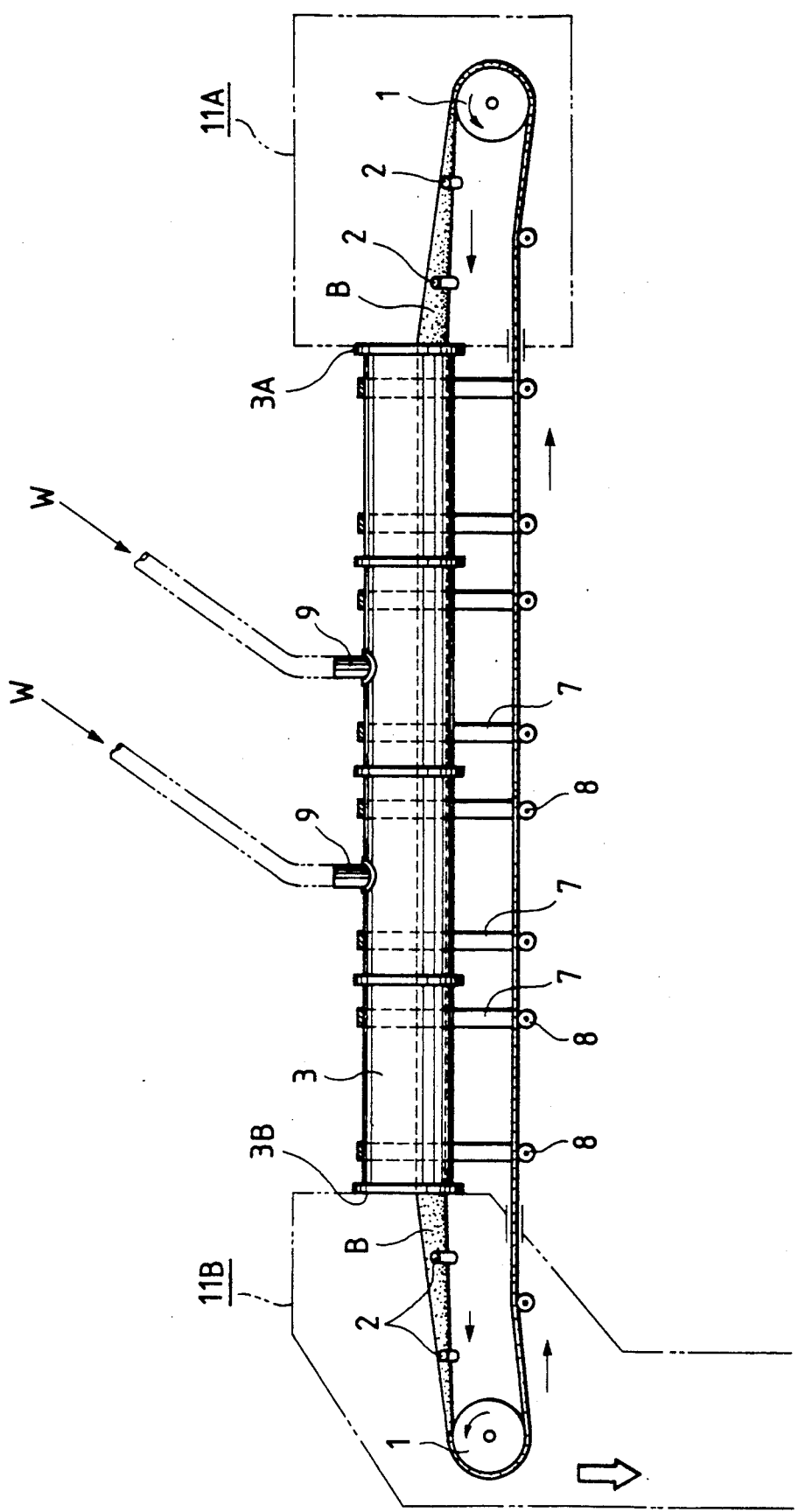
FIG. 1 is a side view showing an apparatus for conveying grain according to the present invention.

Referring to FIG. 1, an endless belt or conveying belt B for conveying grain W is passed around a pair of pulleys 1, 1. A drive unit (not shown) is coupled to one of pulleys 1, 1 to rotate the pulley in one direction so as to drive endless belt B to move in one direction. In this embodiment, the upper run of the endless belt constitutes a conveying section thereof, while the lower run is a return section. The direction of conveying refers to the moving direction of the conveying section.

An intermediate portion of the conveying section of the endless belt B extends through a cylinder 3 to reach the other pulley 1. Between the one pulley 1 and the upstream end, i.e., right end 3A (at right hand in the drawing), of the cylinder and also between the other pulley 1 and the downstream end, i.e., left end 3B (at the left hand in the drawing), of the cylinder 3, a plurality of support rollers 2, 2 are rotatably mounted on inwardly inclined shafts such as to support the opposite edges of the endless belt B from below such that the belt is upwardly curved.

The conveying belt B is in plane contact with the inner periphery of a lower portion of the cylinder 3, and therefore it suitably has a low frictional property.

For example, the back surface of conveying belt B is given a low frictional property by coating it with a fluorine resin or lining it with a cloth made of fluorine resin fibers.

Figure 7:
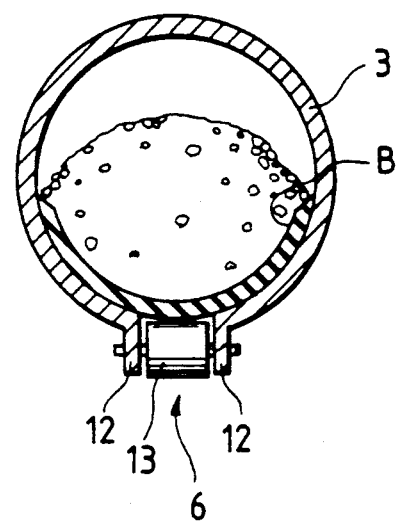
FIG. 7 is a sectional view taken along line VII—VII in FIG. 6.
Figure 6:
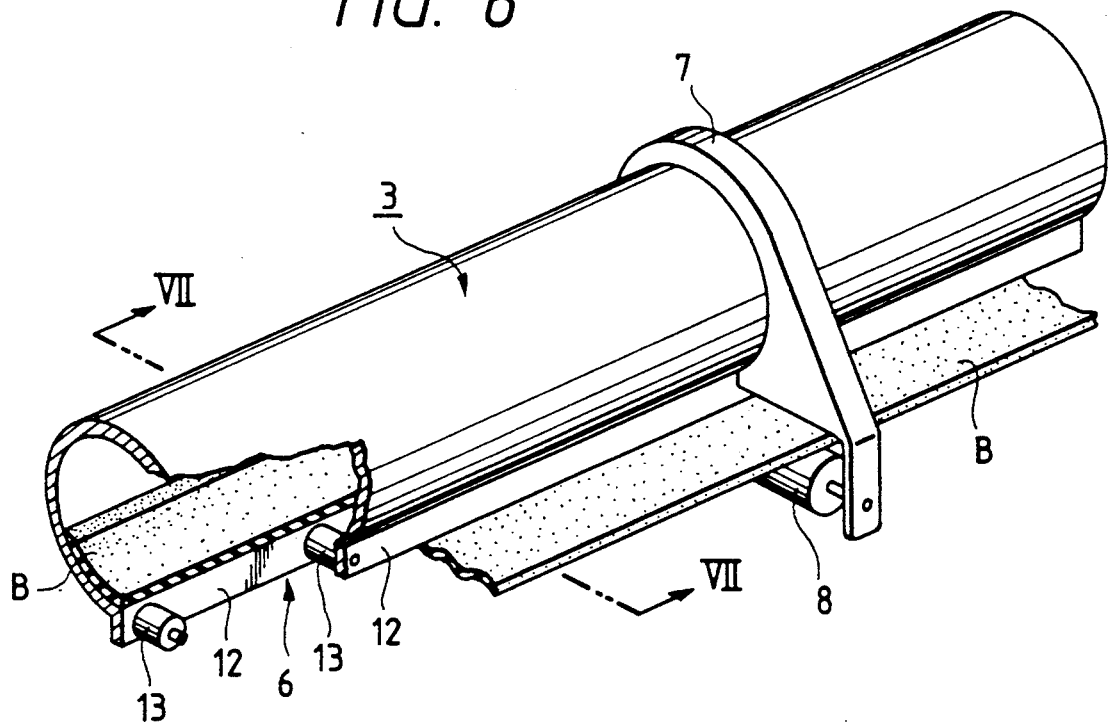
FIG. 6 is a perspective view, partly broken away, showing a cylinder and associated parts of a further embodiment of the invention.

In order that the conveying belt B may smoothly slide through the cylinder 3, as shown in FIGS. 6 and 7, the cylinder 3 may be provided with flanges 12 extending along axial slit 6, and rollers 13 may be rotatably mounted between the flanges 12 such that they support the back surface of the endless belt B.

The opposite edge surfaces of the conveying belt B each form inclined face B1 (FIG. 3) extending toward the back side. With the inclined face B1 formed along each edge of the endless belt B, it is possible to prevent grains from entering the space between the endless belt B and the cylinder 3.

Figure 2:
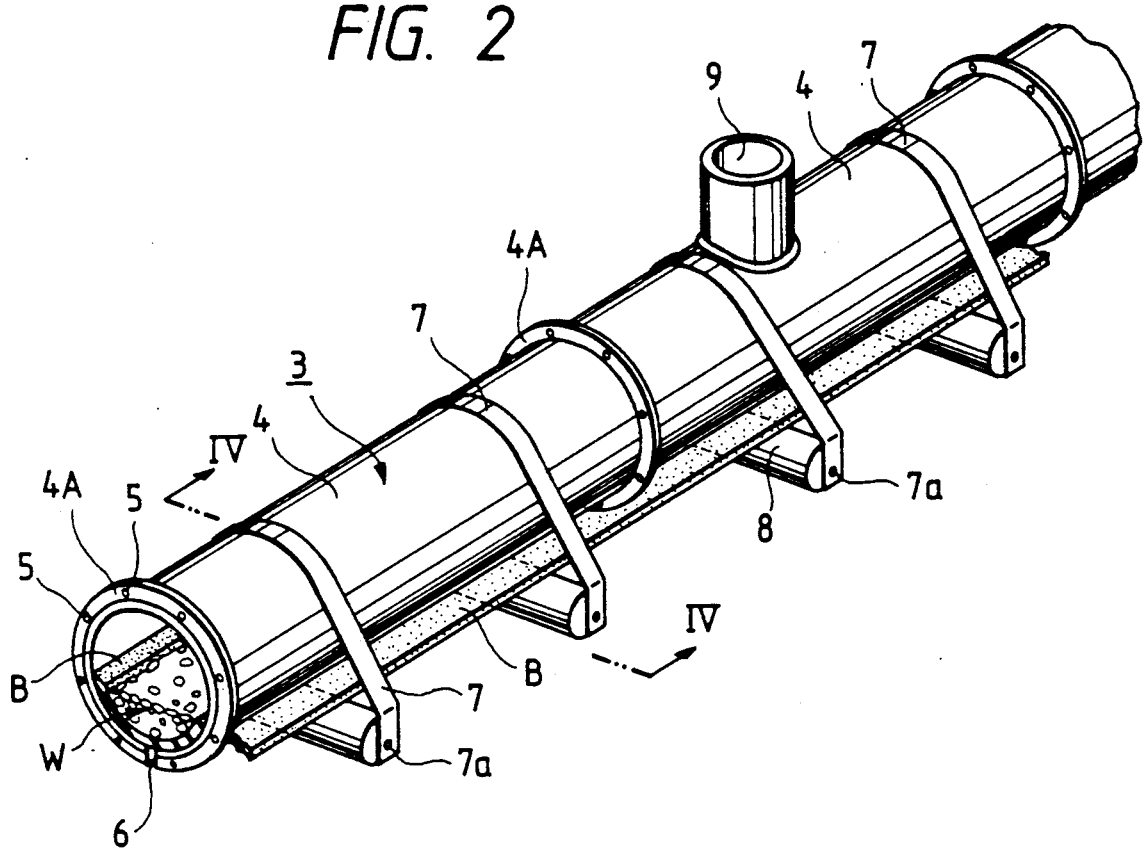
FIG. 2 is a perspective view showing a cylinder and the neighborhood thereof of the apparatus for conveying grain according to the invention.
Figure 3:
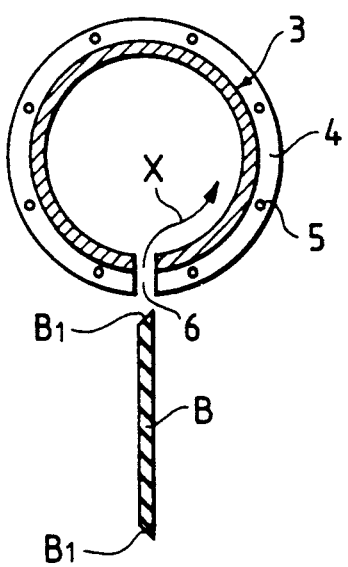
FIG. 3 is a sectional view showing a manner of mounting an endless belt in the cylinder.
Figure 4:
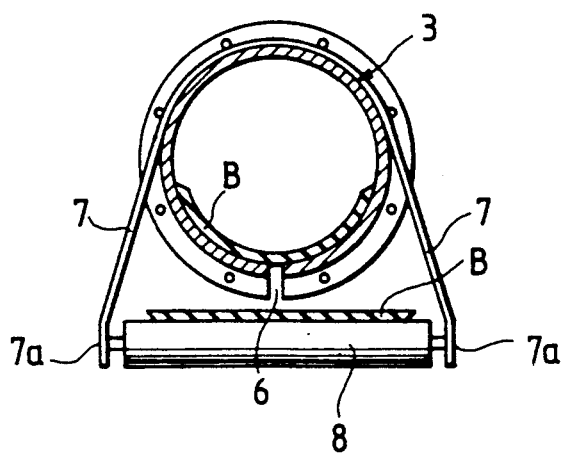
FIG. 4 is a sectional view, to an enlarged state, taken along line IV—IV in FIG. 2.

The cylinder 3 will now be described in detail with reference to FIGS. 2 to 4. The cylinder 3 consists of a plurality of short cylinders 4 with flanges 4A at opposite ends and coupled end to end to one another by bolts and nuts by utilizing bolt insertion holes 5 formed in flanges 4A. Each short cylinder 4 has a slit 6 at its one side wall along the longitudinal direction. The plurality of the short cylinders 4 are coupled to one another with their slits 6 aligned such as to form a single slit 6 extending over the entire length of the cylinder 3. The cylinder 3 is disposed horizontally or in a slightly inclined state such that the slit 6 is directed downwards. The cylinder 3 has grain inlets 9, which are faced by outlets of a grain storage. The conveying belt B may be installed in an arcular form in the cylinder 3 by inserting it from its edge through the slit 6 in the direction of an arrow X as shown in FIG. 3.

Mounting bands 7 are provided around certain portions of the cylinder 3. They each have downwardly extending opposite ends formed with respective bearings 7a. Roller 8 is rotatably provided between the opposed bearings 7a to support the return section of the conveying belt B. The overall length of the cylinder 3 may be adjusted by appropriately selecting the number of short cylinders 4 coupled to one another.

Figure 5:
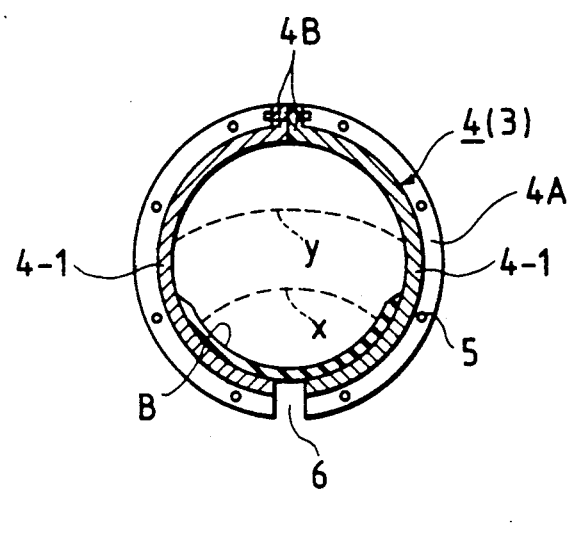
FIG. 5 is a sectional view of a cylinder and associated parts showing a different embodiment of the invention.

FIG. 5 is a sectional view of a cylinder 3 in another embodiment of the present invention. In this embodiment, each short cylinder 4 consists of semi-cylindrical halves 4-1. These semi-cylindrical halves 4-1 have flanges 4B for their coupling to each other and also flanges 4A for the coupling of individual short cylinders 4. By connecting flanges 4B together with bolts and nuts a cylindrical body having slit 6 may be formed at one portion of the fabricated cylinder 4.

A box-shaped cover 11A is attached to the end 3A of the cylinder 3 as shown in FIG. 1. By this cover, the upstream portion of the endless belt B can be covered. Downstream cylindrical body 3B, the cover 11B with a hopper is provided. The cover 11B covers a downstream portion of the apparatus for conveying grain while leaving a gap, through which the return section of the belt passes.

With the above construction, the grain W is moved through the cylinder to be conveyed to an intended place. Dust generated in the cylinder thus can be shut up. It is thus possible to prevent scattering of dust into the air and also eliminate falling of grain. Further, since the support of the conveying belt and cover are constituted an integral structure of a cylinder, the apparatus conveyor may be readily manufactured, and its maintenance such as cleaning can be readily done.

When conveying the grain W through the cylinder according to the invention, there are a case of supplying an amount x of grain such as not to fall from the opposite edges of the belt B as shown in FIG. 5 and a case of supplying an amount y of grain such that the supplied grain exceeds the opposite edges of the belt B and leaves a slight gap above the cylinder 3. In both cases, grain can be conveyed smoothly. Further, in the return section belt B is suspended by mounting bands from the cylinder 3. This has an advantage in the aspect of mounting that there is needed no particular frame structure for supporting the rollers supporting the return section.

FIGS. 8 to 11 show a different embodiment of the invention. This embodiment of the grain conveyer is effective in case of conveying grain supplied in a great amount, for instance in a state y shown in FIG. 5. The endless belt B and the cylinder 3 are directly used in this case. At the end 3B of the cylinder 3 is mounted a ring-like guide frame 16 having an inner annular groove 15.

Figure 11:
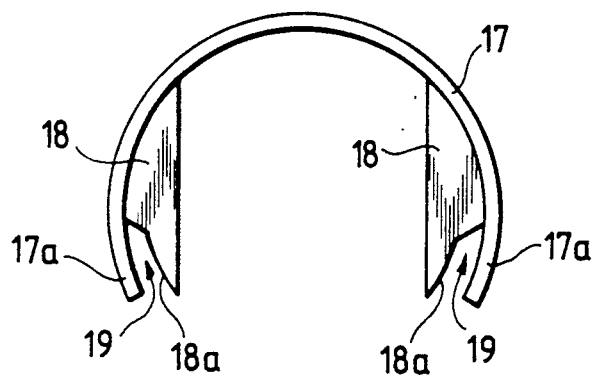
FIG. 11 is a front view showing a fin member provided with a pair of fins.

As shown in FIG. 11, an arcular fin-mounting member 17 is slidably fitted in the annular groove 15. Fins 18 are mounted on opposite ends of the fin-mounting member 17. Lower portion 18a of the fin 18 has an outer shape fitting the shape of the endless belt B which is curved by the inner wall surface of the cylinder and is located on the outer surface side of the endless belt B, and the fin 18 has substantially a vertical inner edge. The pair of fins 18 are inclined such as to approach the center of the endless belt as one goes in the direction of conveying of grain (see FIG. 9). Each end 17a of the fin-mounting member 17 forms gap 19 with the outer side of the lower portion 18a of the fin 18. The shape of the gap 19 is similar to the sectional profile of the end of the endless belt B and has an effect of preventing grain from going to the back side of the fin 18.

Figure 8:
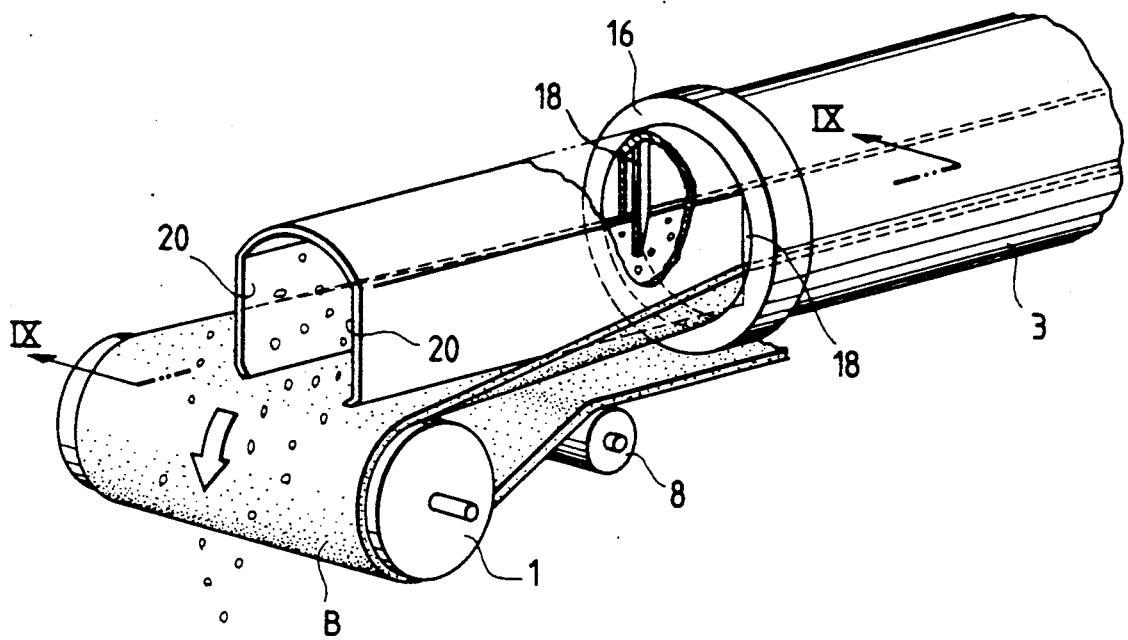
FIG. 8 is a perspective view showing a further embodiment of the invention with a pair of fins mounted on a downstream end portion of a cylinder.
Figure 9:
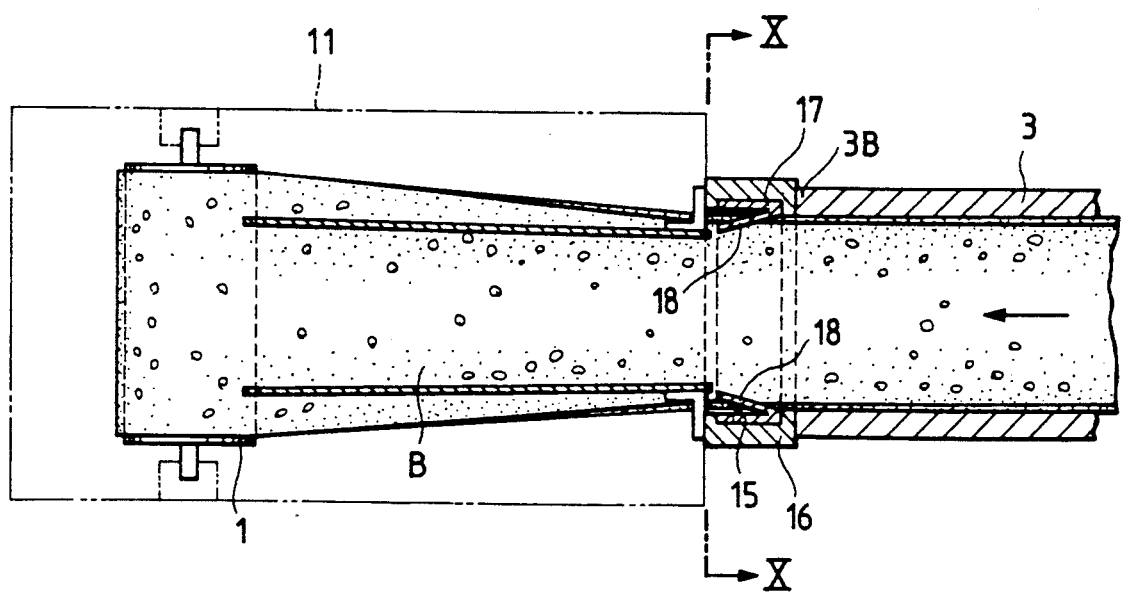
FIG. 9 is a sectional view taken along line IX—IX in FIG. 8.
Figure 10:
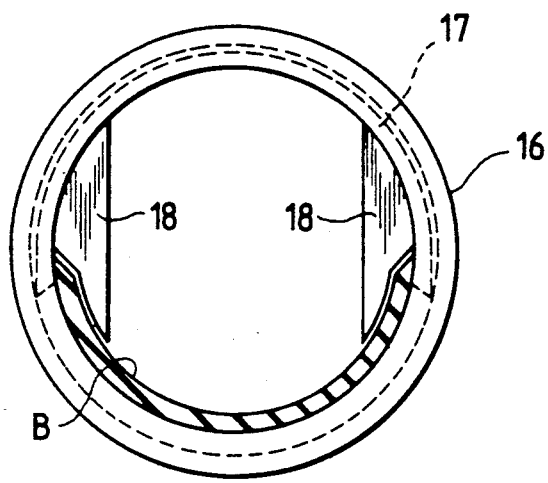
FIG. 10 is a sectional view, to an enlarged scale, taken along line X—X in FIG. 9.

As shown in FIGS. 8 and 9, over the endless belt B extending from the end of the cylinder 3 to the pulley 1, a pair of collapse prevention members 20, 20 are provided to prevent grain, having been pushed up by the pair of the fins 18 to the height of conveyed grain and having cleared the gap between the paired fins 18, from falling to the opposite edges of the endless belt B. In this embodiment, the collapse prevention members 20, 20 are constituted by bending a single plate into a form of a gutter, but it is possible to use two separate plates. In this embodiment, the collapse prevention members 20, 20 are bolted to the fin-mounting member 17.

With this arrangement provided on the endless belt B, the conveying belt B undergoes slight meandering motion as it is moved through the cylinder 13. However, since the fin-mounting member 17 follows the movement of the belt B, it is possible to let grain gather toward the center of the belt without disturbing the movement of the belt B. In addition, it is possible to convey grain up to the neighborhood of the pulley 1 before being allowed to fall. This means that the arrangement need not be directly supported on the return section of the belt or bearings of the pulley, thus permitting smooth conveying of grain.

Figure 12:
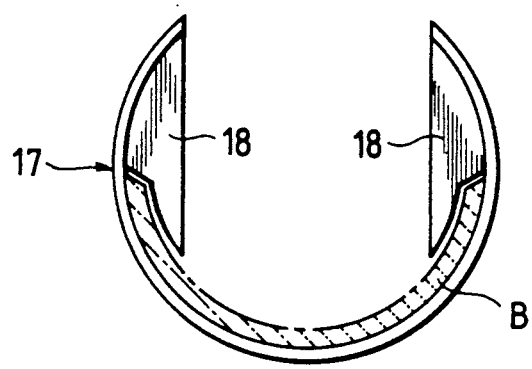
FIG. 12 is a front view showing a modification of the fin member.

FIG. 12 shows a modification of the fin-mounting member 17. Unlike the fin-mounting member 17 shown in FIG. 11, which is an arcular member open downwards, the fin-mounting member 17 in FIG. 12 is an arcular member open upwards. This fin-mounting member 17 is utilized in the same way as and has the same advantages as the fin-mounting member shown in FIG. 11.

What is claimed is:

1. An apparatus for conveying grain comprising:
   a pair of pulleys;
   an endless belt passed around said pulleys;
   a cylinder having a slit extending along a bottom surface, a conveying section of said endless belt being arranged to run in one direction along said cylinder with a back surface of said endless belt in contact with the bottom surface of said cylinder;
   a grain inlet provided on said cylinder; and
   a cover with a hopper and provided to cover one of said pulleys and said endless belt at one end of said cylinder.

2. An apparatus for conveying grain as claimed in claim 1, wherein opposite edges of said endless belt each have an inclined surface inclined from a front surface of said belt toward the back surface thereof.

3. An apparatus for conveying grain as claimed in claim 1 or 2, wherein the back surface of said endless belt is constituted by a material having a low coefficient of friction.

4. An apparatus for conveying grain as claimed in claim 3, wherein the material having the low coefficient of friction is constituted by a fluorine resin layer.

5. An apparatus for conveying grain as claimed in claim 3, wherein the material having the low coefficient of friction is a fluorine resin fiber cloth.

6. An apparatus for conveying grain as claimed in one of claims 1, wherein a roller is rotatably provided in the slit of said cylinder in contact with said endless belt.

7. An apparatus for conveying grain comprising:
   a pair of pulleys;
   an endless belt passed around said pulleys;
   a cylinder disposed such as to surround a conveying section of said endless belt; and
   a pair of fins provided downstream of said cylinder, said pair of fins having lower end portions located on a surface of opposite edges of said endless belt and inclined such that a distance between said pair of fins becomes progressively smaller in a direction of conveying of grain, wherein the pair of fins are provided for rotation in unison with each other in a direction perpendicular to an axis of said cylinder.

8. An apparatus for conveying grain as claimed in claim 7, which further comprises collapse prevention members provided on a portion of said endless belt downstream of said cylinder, said collapse prevention members extending from one of said pulleys, around which said endless belt passes around, to the pair of fins on both sides of said endless belt.

* * * * *